J. H. MILLER.
ELECTRICAL MEASURING INSTRUMENT.
APPLICATION FILED OCT. 13, 1917.
1,412,791.
Patented Apr. 11, 1922.
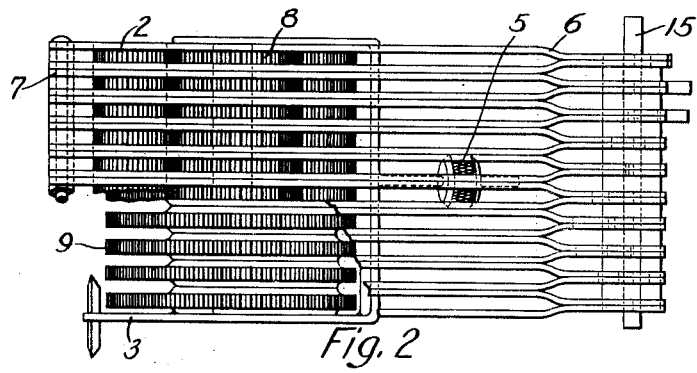
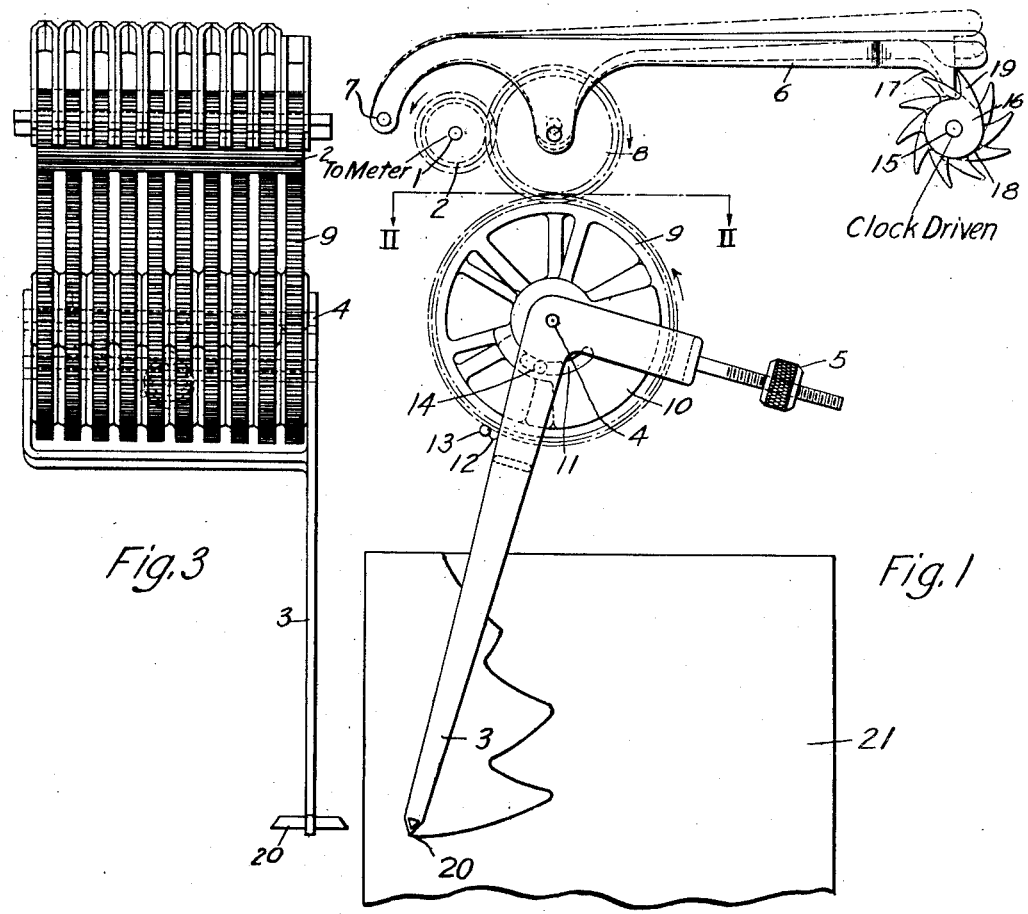
WITNESSES:
INVENTOR
John H. Miller
BY
ATTORNEY

UNITED STATES PATENT OFFICE.

JOHN HAROLD MILLER, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,412,791.           Specification of Letters Patent.     Patented Apr. 11, 1922.

Application filed October 13, 1917. Serial No. 196,402.

*To all whom it may concern:*

Be it known that I, JOHN HAROLD MILLER, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to demand meters.

One object of my invention is to provide a meter of the above indicated character that shall be adapted to indicate or record the integrated periodic demand of energy traversing the same.

Another object of my invention is to provide means whereby the energy may be continuously measured in a plurality of blocks to permit the average rate of consumption of energy to be obtained without overlapping the blocks of energy.

A further object of my invention is to provide a meter of the above indicated character that shall be relatively simple and inexpensive to construct and accurate in its operation.

Figure 1, of the accompanying drawings, is a side elevational view of a portion of a demand meter embodying my invention; Fig. 2 is a top plan view, with parts broken away, of the instrument shown in Fig. 1, and Fig. 3 is a front elevational view of the instrument shown in Figs. 1 and 2.

In practicing my invention, I provide a motor meter to be traversed by the energy the demand of which is to be measured, an indicating device, a plurality of independent means for connecting the indicating device to the meter, and means for successively disengaging the connecting means for the purpose of permitting the same to be reset to their initial positions. By such an arrangement, the energy that has traversed the meter during a predetermined period of time may be indicated, and, since portions of the connecting means are periodically reset, the indicating device will, at all times, indicate the integral demand that has traversed the meter during a predetermined past interval of time.

If the number of independent connecting means is relatively large and the interval of time between the resetting of the same is sufficiently short, a substantially continuous indication of the periodic integrated demand may be obtained at all times.

A motor meter (not shown) is connected to a shaft 1 upon which is mounted a gear wheel 2. A pointer 3 is loosely mounted on a shaft 4 and is provided with a counterbalance weight 5 for the purpose of resetting the same to its initial position when no driving action is applied thereto. A plurality of lever arms 6 are pivotally mounted on a pin 7 and are severally provided with gear wheels 8. A plurality of gear wheels 9 are loosely mounted on the shaft 4 and are adapted to normally engage the gear wheels 8 that are loosely mounted on the levers 6. The gear wheels 9 severally have a counterbalanced portion 10, a slot 11 therein and a projection 12 thereon that is adapted to engage a pin 13, under predetermined conditions. A pin 14, that is mounted on the pointer 3, extends through the slots 11 in the gear wheels 9 for the purpose of constituting a lost-motion driving connection therewith.

A clock mechanism (not shown) is mounted on a shaft 15 upon which a plurality of cam members 16 are also mounted. The cam members 16 are symmetrically disposed about the shaft 15, and each is in alignment with its corresponding lever arm 6. By this arrangement, the downwardly-extending portion 17 of the lever arm 6 normally rides on the annular portion 18 of the cam member 16. However, it is advanced over the portion 19 of the cam member 16 periodically for the purpose of disengaging the gear wheels 8 and 9. Since the cam members 16 are symmetrically displaced around the shaft 15, one of the gear wheels 8 will be out of engagement with its corresponding gear wheel 9 at all times, and, since the gear wheels 9 have counter-balanced portions 10, the gear wheel 9 that is out of engagement with its corresponding gear wheel 8 will turn in a clockwise direction until its projection 12 engages the pin 13.

When energy traverses the meter that is mounted upon the shaft 1, the pointer 3 is moved, through the gear wheels 2, 8 and 9 and the pin 14, a distance proportional to the movement of the meter during a predetermined period of time. Since the gear wheels 8 are continuously disengaged from the gear wheels 9, and, since the gear wheels 9 are continuously being reset to their initial positions, only the gear wheel 9 that is farthest advanced will actuate the pointer 3 through its slot 11 and the pin 14. Since the gear wheels 9 are being continuously reset, it may be assumed that the energy is measured in relatively small blocks, over predetermined periods of time. That is, if one gear wheel 9 has moved a predetermined distance, the pointer 3 will be moved a corresponding distance. However, if the next gear wheel 9 has not moved as far as the first gear wheel, the weight 5 will move the pointer 3 in a clockwise direction until the pin 14 engages one end of the slot 11. By such an arrangement, no overlapping of the blocks of energy being measured will obtain and the pointer 3 will, at all times, indicate the periodic integrated demand and, consequently, the average demand over a predetermined period of time.

The pointer 3 may be supplied with a marking device 20 that is adapted to cooperate with a record sheet 21 which may be driven by any suitable form of clock mechanism (not shown) to record, at any instant, a continuous record of the average integrated demand of the energy traversing the meter.

While the driving mechanism has been described and illustrated as comprising gear wheels, it will, of course, be understood that friction wheels may be used, and many other modifications may be made without departing from the spirit and scope of my invention, as set forth in the appended claims.

I claim as my invention:

1. In a measuring instrument, the combination with an integrating meter and a marking device, of a plurality of means for transmitting movement from the meter to the marking device simultaneously connected to the meter, and means for successively disconnecting said transmission means from the meter and for permitting the same to reset to their initial positions.

2. The combination with an integrating meter and a marking device, of a plurality of gears for transmitting movement from the meter to the marking device simultaneously connected to the meter, and means for successively disconnecting said gears from the meter and for permitting the same to reset to their initial positions.

3. In a measuring instrument, the combination with a motor meter and an indicating device, of a plurality of means for transmitting movement from the meter to the indicating device simultaneously connected to the meter, and means for successively disconnecting transmission means from the meter and for permitting the resetting of the same to their initial positions while disconnected from the meter.

4. In a measuring instrument, the combination with a motor meter and an indicating device, of a plurality of means having lost-motion connections with the indicating device for moving the same a distance proportional to the greatest distance moved by any one of the said means, and a time-controlled device for permitting the said means to be successively reset.

5. The combination with an integrating meter and an indicating device, of a plurality of transmitting means for so connecting the meter to the indicating device that the indicating device is moved a distance proportional to the greatest movement of the transmitting means, and means for periodically resetting each of the transmitting means in a predetermined sequence.

6. The combination with a motor meter and an indicating device, of a plurality of freely-movable gear wheels simultaneously connected to the meter and having a lost-motion driving connection to the indicating device, of a time-actuated device for successively disconnecting each of the gear wheels from the meter to permit the same to be returned periodically to their initial positions.

7. The combination with a motor meter and a freely-movable indicating device, of a plurality of loosely-mounted gear wheels having a lost-motion driving connection with the indicating device, a second plurality of gear wheels connected between the meter and the other gear wheels, and means for successively moving the second plurality of gear wheels out of engagement with the first plurality of gear wheels to permit the first plurality of gear wheels to severally return periodically to their initial positions.

8. The combination with a motor meter and an indicating device, of a plurality of means simultaneously actuated by the meter and having lost-motion connections with the indicating device for successively moving the same a distance proportional to the greatest distance moved by each of the said means in a predetermined time, and means for periodically resetting the said meter-actuated means to their initial positions.

9. The combination with a meter element and indicating means actuated thereby, of means operatively connected between the meter element and said indicating means for periodically disconnecting the indicating means from the meter element to reset the indicating means and connecting the latter to the meter element at an intermediate position on the reset path of movement of the indicating means.

10. The combination with a meter element and indicating means actuated thereby, of means operatively connected between the meter element and said indicating means for disconnecting the indicating means from the meter element to reset the indicating means at the terminations of predetermined successive blocks of energy being measured by the meter, and means actuated in accordance with the values of the successive energy blocks for connecting the indicating means to the meter element.

11. The combination with a measuring device and means for indicating the measurements thereof, of means for adjusting the indicating means at predetermined time intervals in accordance with the values of successive increments of the quantity being measured at the time of said adjustments.

12. The combination with a measuring device and means for indicating the measurements thereof, of means for periodically adjusting the indicating means in accordance with the values of successive increments of the quantity being measured at the time of said adjustments.

13. The combination with a measuring device and means for indicating the measurements thereof, of means for periodically resetting the indicating means to positions determined by the values of successive increments of the quantity being measured at the time of resetting.

In testimony whereof, I have hereunto subscribed my name this 29th day of Sept., 1917.

JOHN HAROLD MILLER.